June 10, 1958  C. R. CARKEEK ET AL  2,838,388
PROCESS FOR GASIFYING CARBONACEOUS FUELS
Original Filed June 18, 1949
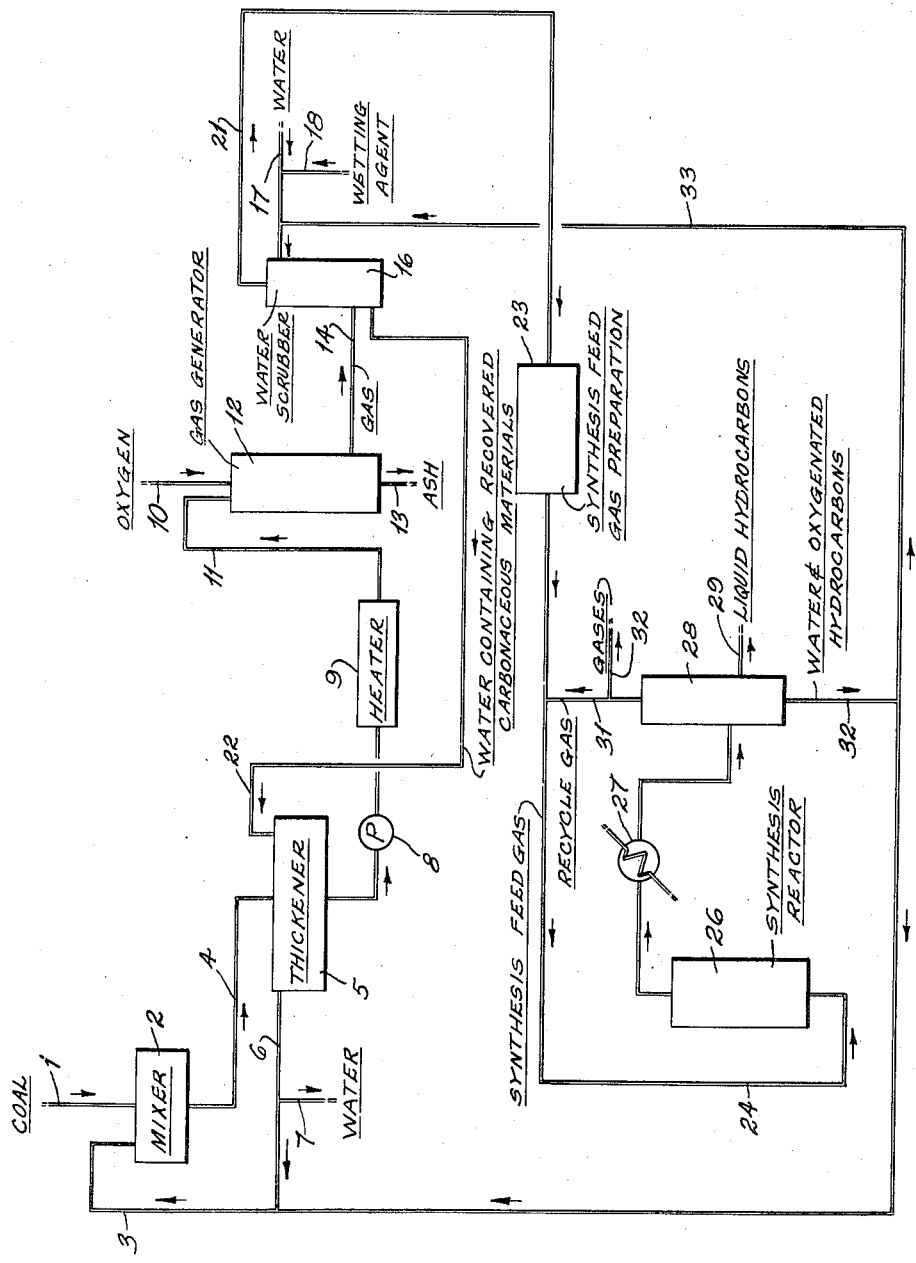
INVENTORS
CHARLES R. CARKEEK
DALE M. STRASSER
BY
ATTORNEYS

2,838,388

PROCESS FOR GASIFYING CARBONACEOUS FUELS

Charles R. Carkeek, Pasadena, Calif., and Dale M. Strasser, Cuyahoga Falls, Ohio, assignors to The Texas Company, New York, N. Y., a corporation of Delaware Continuation of application Serial No. 99,908, June 18, 1949. This application April 5, 1954, Serial No. 420,848

2 Claims. (Cl. 48—206)

This invention relates to a process for the gasification of carbonaceous fuels, such as hydrocarbons, coal, coke, oil shale and the like.

In one of its more specific aspects this invention relates to an improved method for the synthesis of hydrocarbons from solid carbonaceous fuels. This invention may also be used for the production of fuel gases from solid or liquid carbonaceous fuels.

The process of this invention is particularly applicable to the treatment of coal, for example, anthracite, bituminous coal and lignite.

An object of this invention is to provide an improved process for the conversion of carbonaceous fuels to carbon oxides and hydrogen.

Another object of this invention is to provide an improved process for the production of liquid hydrocarbons from carbonaceous fuels.

Still another object is to provide an improved process for the generation of carbon monoxide and hydrogen by reaction of solid carbonaceous fuels with oxygen.

Carbonaceous fuels other than those liquid hydrocarbons suitable for use as motor fuels may be converted to motor fuels by the Fischer-Tropsch type synthesis. By this process various carbonaceous fuels including natural gas, heavy oils, coal, coke, oil shale, and the like, may be converted to motor fuels, such as gasoline or diesel fuel. The carbonaceous fuel is first reacted with oxygen and steam to produce a mixture of carbon monoxide and hydrogen as the synthesis feed gas which is, in turn, converted in the presence of a synthesis catalyst, usually iron or cobalt, to liquid hydrocarbons suitable for use in motor fuels. It is desirable to carry out the oxidation of the fuel to carbon monoxide with relatively pure oxygen, rather than with air. Some difficulty is generally encountered in the generation of the synthesis feed gas, wherein carbon dioxide formation is undesirable and is minimized, with solid carbon in the produced gas. This is true even when methane is used as the carbonaceous fuel. Solid carbon contained in the synthesis feed gas may be removed therefrom by various means.

The solid carbon may be recovered from the gas stream by contacting the gas with water. In accordance with the present invention, the recovered carbon is returned to the gas generator, in admixture with fresh fuel, for the production of additional synthesis gas. Carbon values of the fuel which might otherwise be wasted are utilized by the present invention. Not only is entrained carbon so recovered, but also any oils, tars, and oxygenated hydrocarbons contained in the gas are recovered and utilized for the production of synthesis gas. According to this invention, water soluble oxygenated hydrocarbons produced in the synthesis reaction are also fed into the synthesis gas generator for the production of additional carbon monoxide and hydrogen.

The carbon contained in the synthesis gas may be readily wetted and removed therefrom by means of the water and water-soluble oxygenated hydrocarbons formed in the synthesis reaction. The catalytic reduction of carbon monoxide results in the formation of water and oxygenated hydrocarbons. These may be separated from the hydrocarbon product by condensation of the normally liquid products of the synthesis reaction. The water, normally liquid hydrocarbons, and oxygenated hydrocarbons separate into two immiscible liquid phases, namely, a liquid hydrocarbon phase and a water phase. It has been found that the water phase, that is, the water produced in the reaction and the water-soluble oxygenated hydrocarbons, is particularly effective for the wetting of solid carbonaceous particles.

In a co-pending application of du Bois Eastman and Leon P. Gaucher, Serial No. 49,626, filed September 16, 1948, now abandoned, a novel process for the gasification of solid carbonaceous material is described. In accordance with the method described in said application, particles of solid carbonaceous fuel, for example, coal, are admixed with a liquid to form a fluid suspension or slurry. The slurry is passed as a confined stream through a heating zone where it is heated to an elevated temperature such that the liquid is vaporized and the carbonaceous solid particles suspended in the resulting vapors. The suspension of solid particles is passed through the heating zone under conditions of turbulent flow. The heating step results in disintegration of the particles to powder.

Without in any way limiting the invention, it may be postulated that the disintegration is the combined result of the mechanical attrition of the particles due to collision with one another in flowing through the tube of the heater and to explosion of the individual particles by vaporization of the liquid within the interstices of the particles. This novel step of heating and pulverizing solid carbonaceous material is advantageous in connection with the present invention. Water containing wetting agents, and particularly the oxygenated hydrocarbons from the synthesis reaction, may be most advantageously used to make up a slurry of carbonaceous solids in water as feed for a synthesis gas generator in accordance with the procedure disclosed in said application Serial No. 49,626.

Various surface-active agents may be used as the wetting agents, for example, alcohol sulfates; alkyl aryl sulfonates, alkyl sulfonates; sulfated and sulfonated amides, esters, and amines, sodium sulfasuccinic esters, and quaternary ammonium compounds. The oxygenated hydrocarbons recovered from the synthesis reactor in accordance with this invention have wetting properties which improve the degree of dispersion obtainable, permitting use of a minimum quantity of water and resulting in more thorough wetting of the carbonaceous particles. Wetting of the particles and penetration of the water into the interstices of the particles result in a greater degree of disintegration when the slurry is heated to vaporize the water. This water phase from the synthesis step is also particularly suited as a scrubbing agent for water scrubbing of the raw gas from the synthesis gas generator. The improved wetting properties imparted to the water by the oxygenated hydrocarbons greatly aid in wetting the entrained solid particles from the gas stream. The resulting aqueous mixture of oxygenated hydrocarbons and solid carbonaceous materials is most advantageously used in the preparation of the coal slurry, which is, in turn, fed into the gas generator. Under the conditions existing in the generator, the oxygenated hydrocarbons contained in the water are converted into carbon monoxide and hydrogen and the steam resulting from vaporization of the water is utilized in the generator for the production of hydrogen. The solid carbonaceous particles supplement the fresh solid carbonaceous feed material.

The quantity of liquid admixed with the coal to form the suspension may vary considerably depending upon process requirements and the feed material. A minimum of about 35 percent liquid by weight is required to form a fluid suspension with water. The liquid content of the suspension may be controlled by first mixing the solid with a quantity of liquid in excess of the required quantity and adjusting the consistency to the desired value by removal of excess liquid in a conventional thickener. The suspension is readily pumped with suitable equipment, e. g., with a diaphragm type pump, of the type commonly used for handling similar suspensions of solids. The suspension may be made up at a point some distance away from the processing site and pumped to the site in a pipeline.

Some coals require substantial theoretical amounts of steam for the production of hydrogen and carbon monoxide by reaction with steam and oxygen at temperatures within commercially attainable limits (2000° F. to 3000° F.). Others contain water in sufficient quantity or even in excess of the theoretical requirements. Anthracite is an example of the former, requiring a considerable quantity of steam, for example, 30 percent by weight. Lignite is an example of the latter, often containing more than the theoretical requirement of water. Water in excess of the theoretical requirement is not detrimental to the gasification reaction. While anthracite, because of its relatively high steam requirement, is an excellent feed material for the process of this invention, lignite may also be used. Excess water has an effect on the generator temperature and oxygen requirements.

Anthracite silt may advantageously be used as a feed material for the present process. Anthracite silt is a term applied to the fine particles of coal and associated impurities, obtained as a by-product in the mining, handling, and sizing of anthracite coal. Anthracite silt may be used in the present process without preliminary grinding. It ranges in size from about 3/16 inch average diameter, to about 200 mesh, the bulk of the material falling within the range of 3/32 inch to 100 mesh.

The size of the coal particles fed to the heating step is not of especial importance to the successful operations of the invention. Particles of a size which may be passed through the heater tubes without difficulty may be used, i. e., particles having an effective diameter less than one-third the pipe diameter. Generally, it is preferable to use particles less than about one-quarter inch in average diameter. Since the heating of the dispersion under turbulent flow conditions results in disintegration of the coal, costly pulverization by mechanical means is eliminated. It is contemplated in most applications of this process that the coal will be reduced only to a particle size such that it may be readily handled as a suspension or slurry. The coal may be crushed mechanically to about one-fourth inch in average diameter with a relatively small expenditure of power. Further mechanical reduction in size becomes progressively more expensive, pulverization requiring large expenditures of power. It is evident that this process possesses important advantages over conventional methods which involve separate pulverization and carbonization.

The linear velocity of a liquid suspension at the inlet to the heating coil should be within the range of from about ½ foot to about 10 feet per second, suitably about 1 to 2 feet per second. The velocity of gaseous dispersions, as at the outlet of the coil, should be within the range of from about 25 to about 200 feet per second, suitably about 50 to 100 feet per second.

The temperature at the outlet of the heating coil may range from about 250 to 1500° F. or higher. The temperature preferably is at least sufficient to insure substantially complete vaporization of liquid present in the dispersion by the time it is discharged from the heating zone. Preferably a temperature within the range of 600 to 1400° F. is attained at the outlet of the coil. The higher temperatures, within practical limits, are usually advantageous. The extent of carbonization, i. e., distillation of volatilizable constituents from the coal, may be controlled by control of the temperature.

Pressure, in itself, is not critical in the heating step. The temperature and pressure relationships affecting vaporization are well known. It is desirable to operate the heating zone at a pressure somewhat higher than the operating pressure of the gasification zone. In the generation of fuel or synthesis gas, it is often desirable to operate the gasification step at an elevated pressure, for example, 300 to 600 pounds per square inch. The heating and pulverizing step may be operated at a corresponding pressure sufficient to insure flow through the heating coil and into the generator at the desired rate. A considerable pressure drop takes place in the heating zone due to resistance to flow. This drop may be on the order of, for example, 100 pounds per square inch. Often it is desirable to reduce the pressure suddenly in the heating zone or at its outlet to enhance the vaporization and disintegration actions of the heating step.

Part of the vapors may be separated from the powdered solid before it is fed into the generator or part of the solid may be sepaarted from the gasiform dispersion. Separation of powdered solids from gases or vapors may be effected in a number of ways. A cyclone separator is generally effective for removal of solids from gases. Very fine particles may be separated with a Cottrell precipitator. Less desirable are separators of the filter or liquid contact type. The vapors separated from the powdered carbonaceous material may, if desired, be condensed and reused in the process.

Preferably the gasification step is carried out with an oxygen concentrate, e. g., commercial oxygen containing 95 percent or more oxygen by volume. The gasification reaction is exothermic and is carried out at an elevated temperature, for example, 2000 to 2600° F. The temperature may be controlled by regulating the relative proportions of oxygen and steam supplied to the gasification zone. Heat from the gasification reaction may be used to supply heat for heating and disintegrating the carbonaceous material and vaporization of water.

In a preferred embodiment of this invention, coal in particle form is admixed with water containing water-soluble oxygenated hydrocarbons resulting from the interaction of carbon monoxide and hydrogen to form a slurry or fluid suspension of the solid particles. The slurry is pumped through a tubular heating zone of restricted cross sectional area wherein it is heated to a temperature at least sufficient to convert substantially all of the liquid to vapor. The heating step produces a gasiform dispersion of powdered coal in vapor, the vapor comprising steam and vaporized oxygenated hydrocarbons. The solid carbonaceous material and at least a portion of the steam and oxygenated hydrocarbon vapors are admixed with elemental oxygen and passed into a synthesis gas generator.

The figure is a diagrammatic elevational view illustrating a preferred method of carrying out the process of the present invention.

With reference to the figure, coal is introduced through line 1 to a mixer 2. Sufficient liquid to form a fluid slurry is admitted to the mixer through line 3. The resulting suspension is passed through line 4 to a thickener 5 of conventional design wherein excess liquid is removed and the relative proportions of liquid and coal are adjusted to the desired value. It is desirable to remove as much water as possible in the thickener while still retaining fluidity of the slurry. Excess liquid is discharged from the thickener through line 6 from which it may be returned to the mixer through line 3 or withdrawn through line 7 and discarded or returned to the process, as will be brought out in more detail hereinafter. The slurry from the thickener is withdrawn by pump 8 and pumped through heater 9 and line 11 into a gas generator 12. Oxygen is admitted to the gas generator through line 10.

In the gas generator 12, steam, oxygen and fuel are interacted to produce carbon monoxide and hydrogen. Preferably, the generator reaction zone is substantially unobstructed and of such dimensions that the ratio of the internal surface of the generator to the surface of a sphere of the same volume is less than about 1.5. Ash and slag are discharged from the generator through line 13.

The product gases, comprising predominantly carbon monoxide and hydrogen, are discharged from the gas generator 12 through line 14 into a water scrubber 16. In the water scrubber 16 the gas is initimately contacted with water containing a wetting agent. Water from any suitable source may be supplied to the scrubber 16 through line 17 and a wetting agent of any suitable type supplied through line 18. Preferably water from the thickener 5 through line 7 is supplied to line 17. Since this water contains soluble wetting agents and oxygenated hydrocarbons, it is advantageous to return all or as much as is required for the process. The gas leaving the scrubber 16 is free from solid carbonaceous materials and is discharged through line 21 as the synthesis feed gas. Water containing recovered carbonaceous materials is withdrawn from the water scrubber and passed through line 22 to the thickener 5. In the thickener the solid carbonaceous materials and the hydrocarbons insoluble in water are admixed with the fresh coal fed to the process. The slurry withdrawn from the thickener 5 through line 8, therefore, comprises fresh coal, carbonaceous materials recovered from the synthesis feed gas and wetting agents contained in the water. These wetting agents serve to improve the slurry and to enhance the pulverization of the coal particles.

Gases from the scrubber 16 pass through line 21 to a synthesis feed gas preparation zone 23 wherein the gases are freed from objectionable impurities, such as sulfur, and the ratio of hydrogen to carbon monoxide is adjusted to the desired value for the synthesis of hydrocarbons. The synthesis feed gas then passes through line 24 into the synthesis reactor 26 wherein it is contacted with a suitable synthesis catalyst, for example, an iron or cobalt catalyst, under reaction conditions favorable for the production of normally liquid hydrocarbons.

The effluent from the synthesis reactor passes through a cooler 27 into a separator 28. The synthesis reactor effluent is separated into various product fractions including normally liquid hydrocarbons, an aqueous solution of oxygenated hydrocarbons and normally gaseous materials. The liquid hydrocarbons are withdrawn through line 29 for further treatment. The gases, comprising unconverted reactants and gaseous hydrocarbons, are discharged from the separator and may be recycled to the synthesis reactor through line 31 into line 24 or discharged from the system through line 32. The water and oxygenated hydrocarbons are withdrawn from the separator through line 32, from which they may be passed via line 3 into the mixer 2 for use in the preparation of fresh feed slurry. Part or all of the water and oxygenated hydrocarbons may be passed through line 33 to the water scrubber 16 where they may be used for the scrubbing of the gas from the generator 12 either alone or in conjunction with fresh water from line 17.

This application is a continuation of our application, Serial No. 99,908, filed June 18, 1949, now abandoned.

Obviously many modifications and variations of the invention, has hereinbefore set forth, may be made without departing from the spirit and scope thereof and, therefore, only such limitations should be imposed as are indicated in the appended claims.

We claim:

1. In a process for the production of carbon monoxide and hydrogen from solid carbonaceous fuel wherein a fluid slurry of said fuel in particle form in water is formed, said slurry is passed as a confined stream in turbulent flow through a heating zone wherein said water is vaporized forming a dispersion of said fuel particles in vapor, and said dispersion is subjected to non-catalytic reaction with free oxygen in an unobstructed reaction zone autogenously maintained at a temperature in the range of 2000 to 3000° F. producing a gaseous product comprising mainly carbon monoxide and hydrogen and containing free carbon, the improvement which comprises contacting said product gas with an aqueous solution of a water-soluble oxygenated hydrocarbon wetting agent effecting removal of carbon therefrom and forming a suspension of carbon in said aqueous solution, and admixing said solid carbonaceous fuel in particle form with said aqueous solution containing said recovered carbon suspended therein to form said slurry whereby said water-soluble oxygenated hydrocarbon is subjected to heating and vaporization in said heating zone and is fed into said gasfication zone wherein it is converted to carbon monoxide and hydrogen.

2. A process as defined in claim 1 wherein said water-soluble oxygenated hydrocarbon is derived from the products of hydrocarbon synthesis by the Fischer-Tropsch synthesis reaction.

References Cited in the file of this patent

UNITED STATES PATENTS

| 1,373,704 | Bates | Apr. 5, 1921 |
| 2,346,754 | Hemminger | Apr. 18, 1944 |
| 2,472,219 | Lyons | June 7, 1949 |
| 2,558,760 | Keith | July 3, 1951 |
| 2,669,509 | Sellers | Feb. 16, 1954 |

FOREIGN PATENTS

| 168,581 | Great Britain | 1922 |
| | (Complete, not accepted) | |
| 330,221 | Great Britain | June 2, 1930 |